W. E. WILLIAMS.
METHOD OF MANUFACTURING PISTON RINGS.
APPLICATION FILED FEB. 13, 1917.
1,311,937.
Patented Aug. 5, 1919.
2 SHEETS—SHEET 1.
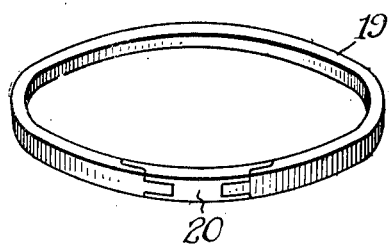
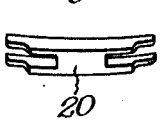
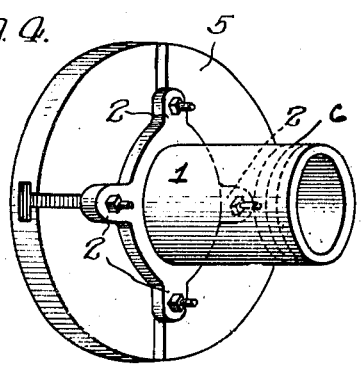
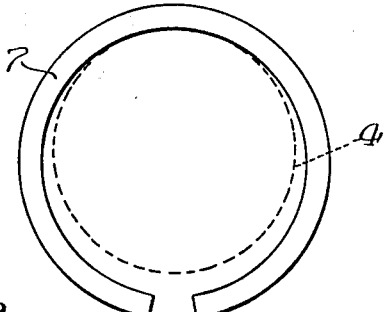
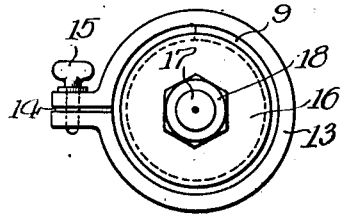
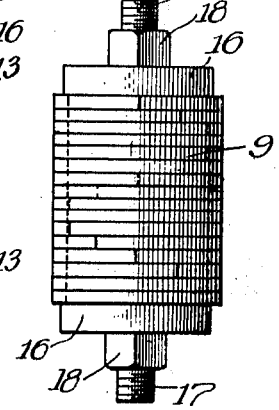
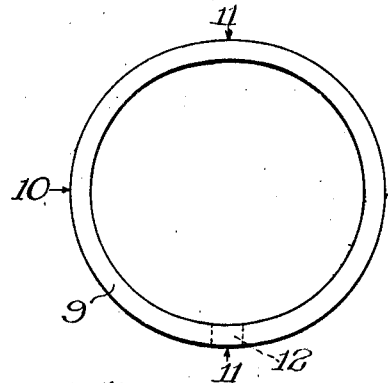
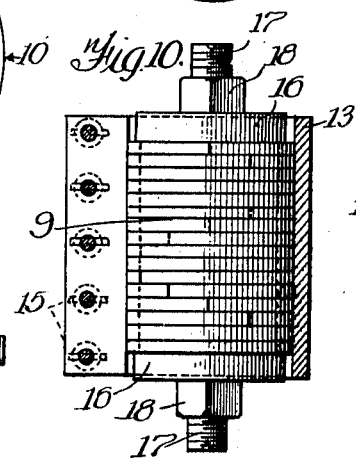
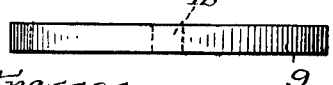
Witnesses:
Howard Johnston
Mary L. Williams
Inventor:
William Erastus Williams W. E. WILLIAMS.
METHOD OF MANUFACTURING PISTON RINGS.
APPLICATION FILED FEB. 13, 1917.
1,311,937.
Patented Aug. 5, 1919.
2 SHEETS—SHEET 2.
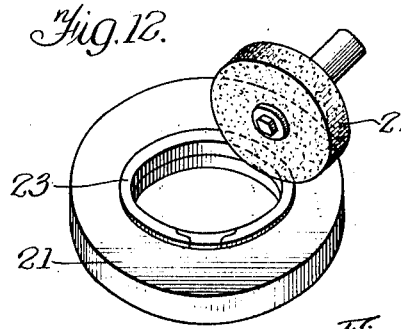
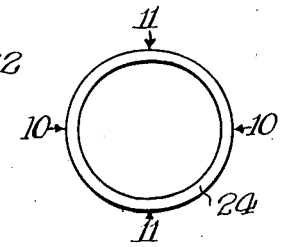
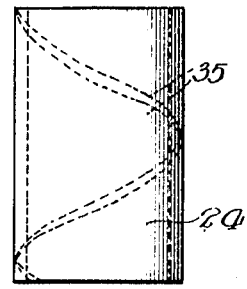
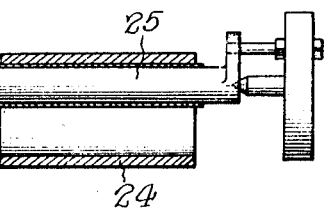
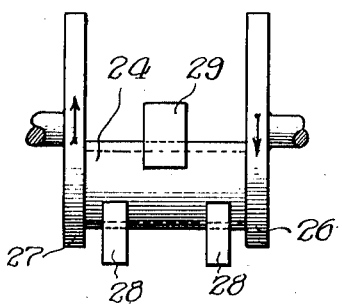
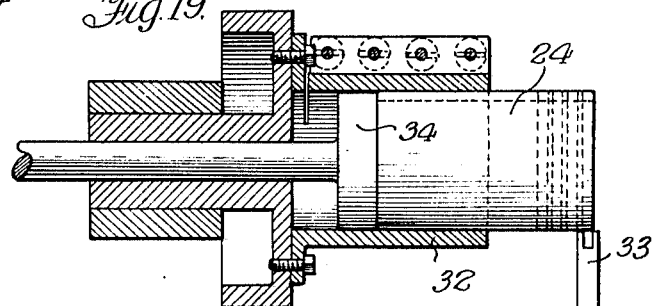
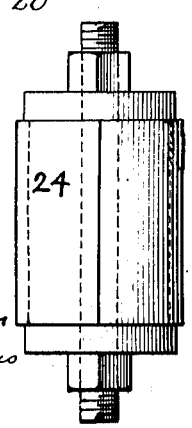

UNITED STATES PATENT OFFICE.

WILLIAM ERASTUS WILLIAMS, OF CHICAGO, ILLINOIS.

METHOD OF MANUFACTURING PISTON-RINGS.

1,311,937.  Specification of Letters Patent.  Patented Aug. 5, 1919.

Application filed February 13, 1917. Serial No. 148,457.

*To all whom it may concern:*

Be it known that I, WILLIAM ERASTUS WILLIAMS, a citizen of the United States, residing at Chicago, county of Cook, and State of Illinois, have invented a new and useful Improvement in Methods of Manufacturing Piston-Rings, of which the following is a specification.

The object of my invention is to lessen the cost of producing a superior piston ring and the invention is set forth in the claims.

My invention more especially relates to rings that are joined at their ends by some special form of coupling piece but may be used with other styles of rings.

Reference will be had to the accompanying drawings in which:

Figures 1, 2 and 3 show the style of ring to which my invention is especially applicable.

Fig. 4 shows in perspective a common old method of turning piston rings.

Fig. 5 is an edge view and Fig. 6 a plan view of a ring made as per Fig. 4.

Fig. 7 is a plan view and Fig. 8 is a side view of a ring casting when each ring is made of a single casting.

Fig. 9 is an end view and Fig. 10 a sectional elevation of a form used for holding individual ring castings for grinding the outside cylindrical surfaces of a stack of rings.

Fig. 11 is an elevation of a stack of ring castings clamped in place ready for grinding the outside cylindrical surfaces of the rings.

Fig. 12 is a perspective view indicating what is called a heel grinder for grinding rings on the side.

Fig. 13 is an end view and Fig. 14 an elevation of a tube casting which I use in my method.

Fig. 15 is an end view of my tube casting when opened up on the side.

Fig. 16 is a sectional elevation of devices used in my method of "snagging" the inside of my tube castings.

Fig. 17 is a side elevation of a disk grinder used in grinding the ends of my tubes.

Fig. 18 is an elevation of the clamp in which I grind my tubes.

Fig. 19 is a plan sectional view and Fig. 20 an end elevation of the general means for cutting rings from my tubes in my method of manufacture.

Fig. 21 is a view similar to Fig. 14, showing in dotted lines the position of a spiral gap or slot sometimes used as a modification in a stock tube.

In the manufacture of piston rings by the methods commonly used a tubular casting is made having a flange or lugs at its base, and such a casting is indicated by Fig. 4, where 1 represents the casting and 2 its lugs. The casting is then bolted or suitably secured through its lugs 2 to a face plate 5 of any suitable lathe, and it is then turned inside and out the desired size of the rings to be made, and then the rings are cut off from the end of the tube as shown by the dotted line 6, the right width for single rings. A ring thus formed is indicated by 7 in Figs. 5 and 6.

After the ring 7 is formed as indicated from the tube end it is cut asunder either squarely or at an incline as is indicated by 8, then the ring is peened to cause it to spread to the form shown in Fig. 6 wherein the dotted line 4 indicates the form of the ring as it was turned from the tube 1. The peening operation spreads the ring to give it the elasticity to hold it out in contact with the cylinder walls when in place.

A more improved and more expensive way of making rings and which results in making better rings consists in casting each ring as a separate casting as is indicated by 9 in Figs. 7 and 8. These single castings are made slightly out of round, the diameter 10—10 being a little longer than the diameter 11—11.

The individual castings 9 are taken by hand one at a time and held over and revolved in contact with a small revolving emery wheel which grinds out the small rough projections on the inside of the ring, but what is known as the "scale" on the inside of the casting is not removed but retained for the purpose of utilizing its superior hardness and elasticity in the finished ring. The operation of grinding out the rough projections is called "snagging."

The casting is then held and revolved by hand flatwise on a little table with its outside cylindrical surface in contact with what is known as the rim of a cup emery wheel or other suitable design of wheel which grinds off the rough outside and this operation is called "snagging the outside."

The single castings one by one are then held in a holder in between two revolving disks having grinding material on their surfaces in contact with both edges of the ring. The disks are mounted to revolve perfectly parallel to each other and one of them is adapted to be adjusted to and from the other in the grinding operation, and thus the ring between them is ground to have true and parallel faces.

The castings thus rough ground are cut open at the point 12 on the diameter 11—11 cutting out the portion between the dotted line in Fig. 8.

The rings are then stacked into a tubular form 13 open at 14 on one side and provided with clamping screws 15, see Figs. 9 and 10. When a suitable number are in the tube the screws 15 are tightened closing the tubular form around the ring and springing their ends together, bringing the rings to approximately a true circle, and while so held clamping disks 16 are clamped on to the stack of the rings by means of the centering mandrel 17 passing through the center and provided with the clamping nuts 18.

The screws 15 of the tubular form are then released and the mandrel removed with its load of rings 9 as indicated by Fig. 11, and placed on centers in a grinding machine which automatically revolves and grinds the outside of the stack of rings to the desired size.

The rings thus ground are released from the mandrel and then fitted for the coupler connection as will be understood from Figs. 1, 2 and 3 wherein 19 indicates the ring and 20 the coupler.

After the coupler is fitted in place the ring is then ground on its sides, one side at a time, by means of what is called a heel grinder which is indicated in diagram by Fig. 12, 21 being a magnetic revolving chuck and 22 the revolving grinding wheel and 23 the ring being ground. The ring and coupler are ground together when joined together as they are intended to be when in service.

The rings after leaving the heel grinder are placed into another tubular form on the same style as 13 before described but smaller in diameter and the rings are again mounted on the mandrel and again ground on the outside which finishes the ring.

The two foregoing methods as described of making rings show the practice as generally heretofore used.

The method of turning the rings from a tube casting is the cheaper method but the rings thus produced are not as good as the rings produced from individual castings.

In the use of individual castings the cost of the castings is high and there is a large loss from poor castings and the labor of inspecting and handling the individual castings is high, as compared with the tube method.

My method consists in casting a tube 24, see Figs. 13 and 14, having the corresponding diameters 10—10 and 11—11 in the same relation as in Fig. 7 for individual rings. I then snag the inside over a grinding mandrel 25 as indicated by Fig. 16, the operator holding and revolving the tube on the mandrel. I then snag the outside by holding and revolving the tube on a table with its outside cylindrical surface in contact with the flat surface of a revolving disk, or in contact with any other suitable grinding surface. I then square the ends of the tube in a disk grinding machine in the same manner that the sides of the individual ring castings are ground as before described. This machine is outlined in Fig. 17 and the revolving disks are indicated by 26 and 27 and the tube by 24 which tube is held in place by suitable blocks 28 and 29.

After the ends are made true the tube is cut open at 30 as indicated in Fig. 15, cutting out the space between the dotted lines 31 in Fig. 14.

If tapered joints are wanted for the ends of the rings instead of the straight slots as indicated by the dotted lines 31 I cut a spiral slot as indicated by the dotted lines 35.

I then take my slitted tube and put it into the tubular form 13 and clamp the central mandrel in place and grind the outside of the tube in the same manner that the stacks of rings were ground as before described.

The tube thus ground on its outside is placed in a special chuck 32 in a special cut off lathe indicated in diagram by Figs. 19 and 20 wherein with suitable cutting off tools 33 the tube is cut into individual rings which are then ready to have the couplers fitted to them. From this point forward my method is the same as in the old methods above set forth.

While I prefer to make my tube open on one side in the manner described and compress it to nearly a circular form for grinding I may make a special machine that will turn, mill or grind a slightly oval tube and then cut the tube open after the operation of outside machining is performed.

The special chuck and lathe of Figs. 19 and 20 are shown as provided with a chuck for holding the tube which is similar in construction to the tubular form 13 before described, and a special feeding or following block 34 is provided for feeding forward the tube at intervals as cut off into rings.

Any suitable tools, means or mechanism may be employed for any of the operations required with my method but I prefer to use those described.

Instead of casting a complete tube and cutting it open as described I may for some cases cast the tube with a slit down the side and proceed in the same manner with this open sided tube.

My method saves approximately three-quarters of the cost of the castings as compared with the cost of individual ring castings and at the same time better castings are obtained.

It saves a large amount of labor in handling and inspecting the individual ring castings and it saves in the cost of snagging, grinding and getting the rings ready for the couplers.

What I claim is:

1. The method of forming piston rings which consists in providing a slightly oval resilient metal tube having a longitudinally extending terminally open slot in its wall, compressing the tube transversely into the form of a circular cylinder, grinding the external curved surface of the compressed tube, and dividing the tube transversely into rings.

2. The method of making piston rings which consists in forming a resilient metal tube having a longitudinally extending, terminally open slot in its wall, compressing the tube transversely to form an approximately circular cylinder, machining the tube while compressed, dividing the tube transversely into rings, and finishing the faces formed by so dividing.

3. The method of making piston rings which consists in forming a resilient tube of oval cross section having a longitudinally extending slot in its wall, compressing the tube transversely into approximately the form of a circular cylinder, grinding the tube externally while compressed, dividing the tube transversely into rings, grinding the surfaces formed by dividing, and re-grinding the outer curved surfaces of the rings.

4. The method of making piston rings which consists in forming from resilient metal a longitudinally slotted tube of non-circular cross section, compressing the tube to the form of a circular cylinder, machining the cylindrical surface of the tube while so compressed, and dividing the tube into rings.

5. The method of making piston rings which consists in casting a longitudinally slotted tube having in cross section approximately the non-circular shape desired for rings to be compressed and inserted in a cylinder, compressing the tube to cylindrical form, machining the outer face of the tube while compressed, and cutting the tube transversely into rings.

6. A method of making piston rings which consists in forming a tube with a spiral opening along and around the tube, then machining the exterior of the tube and cutting it into rings.

7. That process of making piston rings or the like, which is characterized by casting a tube having an opening extending longitudinally thereof; compressing said tube until said opening is partially closed; finishing said tube until its outside diameter is substantially equal to that desired for the rings to be made from said tube, while the tube is thus compressed; and dividing said tube transversely into the number of rings desired.

8. That process of making piston rings or the like, which is characterized by casting a tube having an opening extending longitudinally thereof; compressing said tube until said opening is partially closed; finishing said tube until its outside diameter and its inside diameter are substantially equal to the outside and inside diameters of the rings to be made from said tube, while said tube is thus compressed; and dividing said tube transversely into the number of rings desired.

9. That process of making piston rings or the like, which is characterized by casting a tube with an opening extending longitudinally thereof; and forming from said tube a plurality of rings which, when finished and compressed partially to close the opening therein, will fit correctly the cylinder in which they are to be used.

10. That process of making piston rings or the like, which is characterized by casting a tube with an opening extending longitudinally thereof; and forming from said tube a plurality of rings which, when finished and compressed partially to close the opening therein, will fit correctly the cylinder and piston for which they are to be used.

11. That process of making piston rings or the like, which is characterized by casting a tube; simultaneously forming in said tube an opening extending longitudinally thereof; and forming from said tube a plurality of piston rings.

12. The method of making piston rings which consists in forming a resilient metal tube having a longitudinally extending, terminally open slot in its wall; compressing the tube transversely to form an approximately circular cylinder; machining the tube while compressed; and dividing the tube transversely into rings.

13. The method of making piston rings which consists in forming a resilient metal tube having a longitudinally extending, terminally open slot in its wall; compressing the tube transversely to form an approximately circular cylinder; machining the tube while thus compressed, upon both its inner and outer surface; and dividing the tube transversely into rings.

14. The method of making piston rings which is characterized by forming a resilient metal tube having a longitudinally extending, terminally open slot in its wall; compressing the tube transversely; machining the tube to render the same substantially circular, while thus compressed; and dividing the tube transversely into rings.

In witness whereof I have hereunto subscribed my name, on this 12th day of December, 1916, in the presence of the subscribing witnesses.

WILLIAM ERASTUS WILLIAMS.

Witnesses:
    MARY L. WILLIAMS,
    HOWARD JOHNSTON,
    IMOGENE L. GROS.